Patented Dec. 5, 1922.

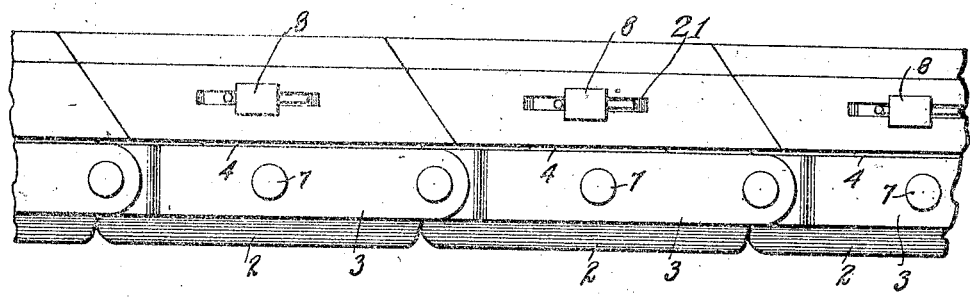
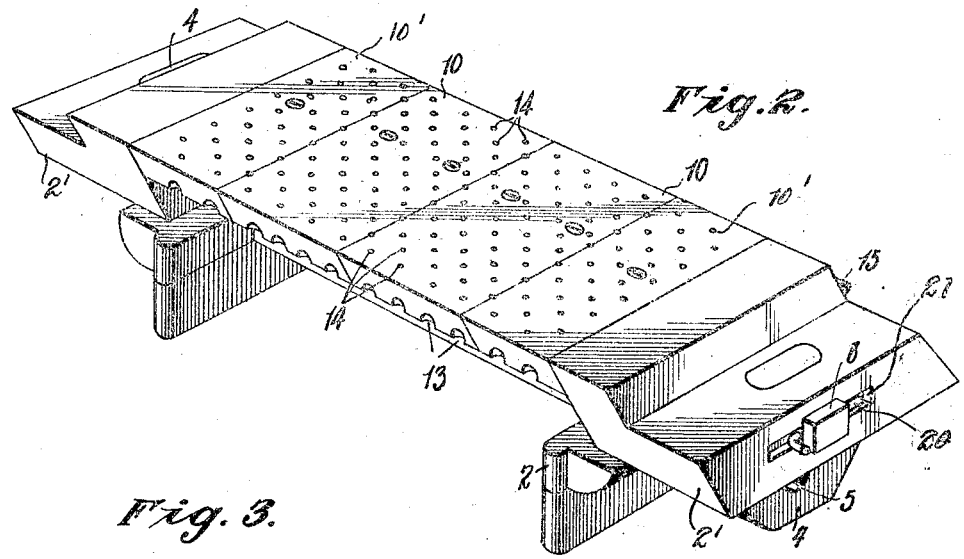
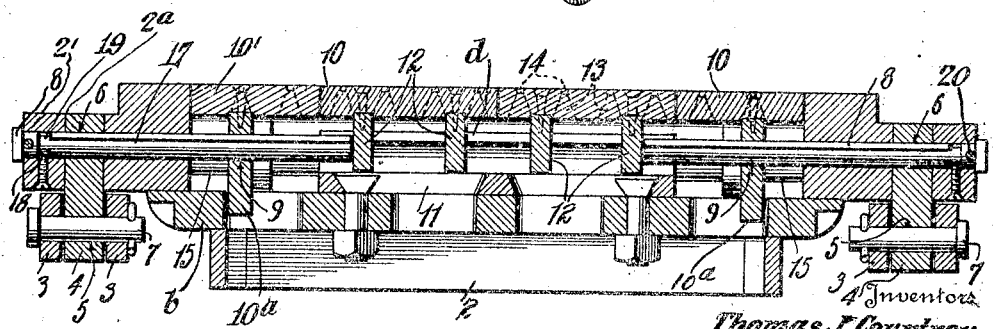

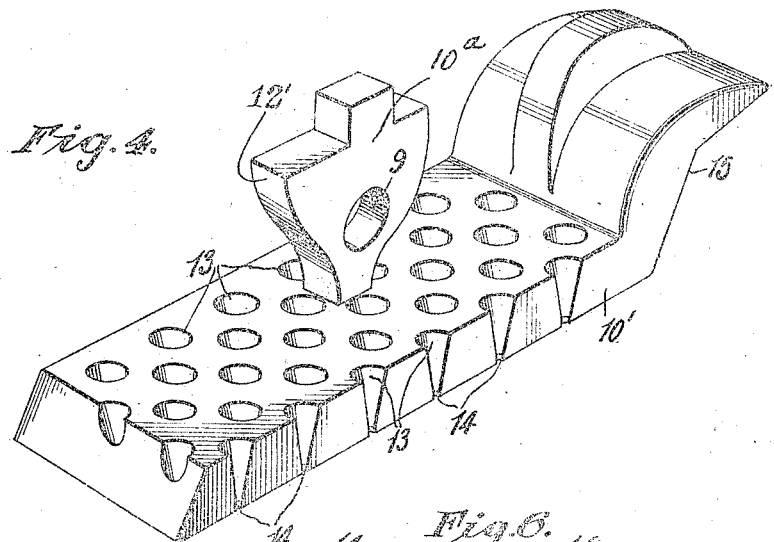
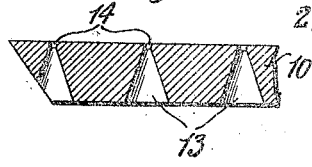
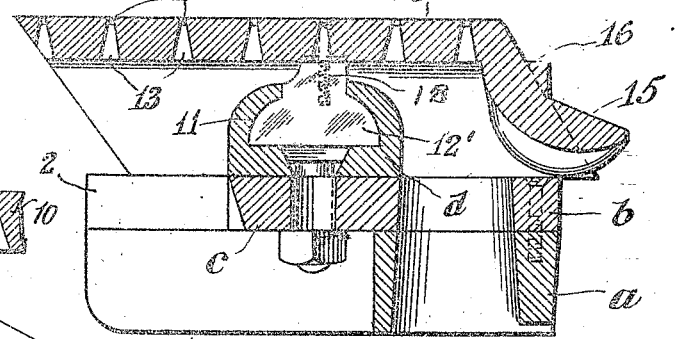
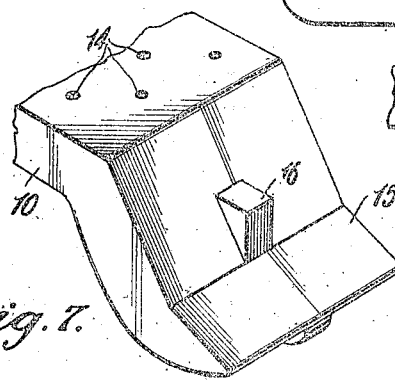
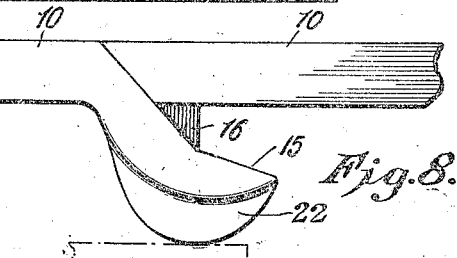

1,437,931

UNITED STATES PATENT OFFICE.

THOMAS J. COURTNEY, WILLIAM A. QUINN, AND JOHN F. CONNORS, OF SCRANTON, PENNSYLVANIA.

STOKER GRATE.

Application filed December 20, 1919. Serial No. 346,284.

*To all whom it may concern:*

Be it known that we, THOMAS J. COURTNEY, WILLIAM A. QUINN, and JOHN F. CONNORS, citizens of the United States, residing at Scranton, in the county of Lackawanna and State of Pennsylvania, have invented certain new and useful Improvements in Stoker Grates; and we do hereby declare the following to be a full, clear, and exact description of the invention, such as will enable others skilled in the art to which it appertains to make and use the same.

This invention relates to new and useful improvements in stoker grates, the main object of the invention being the provision of perforated skeleton grate bars constructed so that air or draft will reach all parts of the grates attached thereon and to provide a grate bar that can be removed for repairs and attached to endless carrying chains while the stoker is in motion.

A further object of the invention is the provision of what will be known as a master key bolt used in securing the grate sections onto the grate bar and also to secure the bar to the traveling or carrying endless chain and to provide an organization in relation thereto which will allow common laborers to make changes or repairs in a very short time while the traveling grate is in motion and thereby save time, labor and money.

A further object of the invention is the provision of a stoker grate having a flat, smooth surface or floor which prevents clinkers from sticking or holding when the grates are dumping their contents in the ash pit.

A still further object of the invention is the provision of a grate having a tail arrangement which will prevent the contents when dumping, from falling any place other than in the ash pit, and also to provide a grate that stands clear of the grate frame so as to enable it to receive air through all parts, suitable passages being provided therefor in the grate sections.

A further object of the invention is the provision of a grate having evenly distributed air spaces arranged so as to burn the smallest size fuel and to provide cone-shaped air holes which prevents blockage and in addition, a hole with nozzle style of construction to increase the air pressure at the point of contact with the fuel.

With the above and other objects in view, the invention consists in the novel features of construction, combination and arrangement of parts hereinafter more fully set forth, pointed out in the claims and shown in the accompanying drawings, in which:

Figure 1 is a side elevation of a plurality of grate flights embodying our invention;

Fig. 2 is a perspective view of one of the flights;

Fig. 3 is a longitudinal section taken through the flight illustrated in Fig. 2, the master bolt being disclosed in elevation;

Fig. 4 is a bottom perspective of one of the end grate sections;

Fig. 5 is a fragmentary transverse section through one of the grate sections, illustrating the air hole construction;

Fig. 6 is a transverse sectional view taken through one of the flights;

Fig. 7 is a fragmentary top perspective of one of the grate sections, and

Fig. 8 is a fragmentary side elevation of two adjacent sections running together.

In the embodiment of our invention, we provide grate bars 2 having laterally projecting end portions 2', said end portions being provided with perforations 2$^a$ in which the upper ends of the lugs 4 are arranged, said lugs having spaced perforations 5 and 6 formed therein, the perforations 5 being adapted to receive the bolts 7 which connect the grate bars 2 to the chain links 3.

The grate sections include a plurality of intermediate sections 10 and end sections 10' arranged adjacent the end portions 2' of the grate bars. The intermediate sections are provided with downwardly projecting lugs 12 having wing portions 12' adapted to be mounted for sliding movement within the guide channel 11 carried by the grate bar, thus retaining the intermediate grate sections in their proper relative positions with respect to the grate bars, as shown in Fig. 3.

The end sections 10' are provided with downwardly projecting lugs 10$^a$ having transverse perforations 9 adapted to receive the retaining bolts 8. These retaining bolts extend transversely through the end portions 2' of the grate, passing through the perforation 6 in the lugs 4 and having their inner ends abutting or arranged adjacent the outer faces of lugs 12. From this it will be apparent that the end sections 10' are securely retained in position.

Each bolt 8 is provided with a longitudinal key way 17 adapted to receive a key member 18 carried by the end portion 2' so that when the bolts are inserted within the perforations provided therefor, the key way 17 will cooperate with the key 18 to permit inward sliding movement of each of the bolts. After each bolt has been inserted its full length, turning movement is imparted thereto to position the key 18 out of alignment with the key way 17. Each bolt is provided adjacent its outer end with an annular groove 19 communicating with the key way 17 in which the key member is disposed when the bolt is in its locking position as shown in Fig. 3, the key member cooperating with the walls of this groove to prevent longitudinal movement on the part of the bolt. In order to retain the bolts in their proper positions and prevent them from rotating so as to bring the key and key way into alignment suitable cotter pins 20 are inserted through the outer ends of the bolts and disposed within recesses 21 formed in the ends of the end portions 2', thus retaining the locking bolts 8 in their proper relative positions.

In assembling the grate, the intermediate sections 10 are placed in position at the end of the central opening of the grate bar, the lugs 12 being disposed in alignment with the grooved guide 11 so that when the sections are moved laterally the wings 12' will engage within the grooves. After the intermediate sections have been placed in position the end sections 10' are then placed in their proper relative positions, as shown in Fig. 3, and the master bolts 8 then moved longitudinally through the perforations 9 in the lugs 10ᵃ to secure the end sections 10' in position. It will be readily apparent that when it is desired to remove any of the grate sections the master bolts 8 can be moved longitudinally to permit removal of the end sections 10' which in turn permits the removal of the intermediate sections.

The grate sections are each provided with inverted conical perforations 13 terminating at their upper ends in cylindrical tuyeres 14. Each of the grate sections is further provided with a lowered tail portion 15 in the form of an obtuse angle, having a lug 16 thereon, the upper face of which lug is disposed in a horizontal plane to provide a seat for the forward end of the adjoining grate section to thus provide for a thorough circulation of air beneath the adjoining sections. Attention is directed to Fig. 8, wherein the tail portion 15 is shown as provided with a central flange 22 extending downwardly from the lower face of the tail portion forming a rest or supporting element, as illustrated.

Attention is directed to the fact that should one of the chain sections 3 become worn or broken, or should it be otherwise desirable the grate bars can be independently and readily detached therefrom as desired by removing the pivot bolts 7. It is also apparent that the grate sections can be quickly and readily removed and replaced, without removing the grate bars from the conveyer. It will also be apparent that by arranging the adjoining sections as illustrated in Fig. 8, it admits of a free circulation of air beneath the grate sections so that the air is delivered upwardly through the tuyeres 14 over the whole surface of the grate.

We claim:

1. In a stoker grate, a grate bar, a channelled guide carried thereby, grate sections having winged lugs movable in said channelled guide, end sections disposed between end portions of the grate bar and the first named sections, perforated lugs carried by said end sections, lugs each having a perforation at each end, securing bolts carried by the grate bar and each extending through one of the perforated ends of the last mentioned lugs and through the perforation in the lug carried by one of the end sections, chain links and means for connecting the second mentioned lugs with the chain links.

2. A device of the character described comprising a grate bar, a grooved guide carried thereby, grate sections having lugs disposed within the groove, end grate sections having depending lugs normally holding the first named sections against sliding movement, chain links, lug members each having one end removably connected with the links, bolts extending through the other ends of said lug members and through portions of the grate bar and through the lugs on the end grate sections for retaining the grate sections in their normal positions.

3. A device of the class described comprising a grate bar, grate sections slidably mounted thereon, end grate sections holding the first named sections against sliding movement, chain links, connecting members each having one end arranged between the links, bolts extending through said links and connecting members, the other ends of said connecting members extending into openings in the grate bar and bolt members extending through the grate bar and connecting members and having engagement with the end sections to normally retain said end sections in position.

4. The combination with grate chains, of grate bars removably secured to said chains, each grate bar comprising elevated end portions and an intermediate transverse guide member having its ends spaced from the inner faces of said end portions, grate sections slidably mounted on the guide member and adapted to be removed therefrom through the spaces mentioned, end grate sections, and means operative to secure the grate bars to the chains, parts of said means operative to maintain the end grate sections in position to prevent the removal of any of the grate sections.

In testimony whereof we affix our signatures.

THOMAS J. COURTNEY
WILLIAM A. QUINN.
JOHN F. CONNORS.